Jan. 13, 1959 K. McCANN 2,868,355
TROUGHING ROLLER ASSEMBLY FOR BELT CONVEYOR
Filed Dec. 23, 1957 2 Sheets-Sheet 1
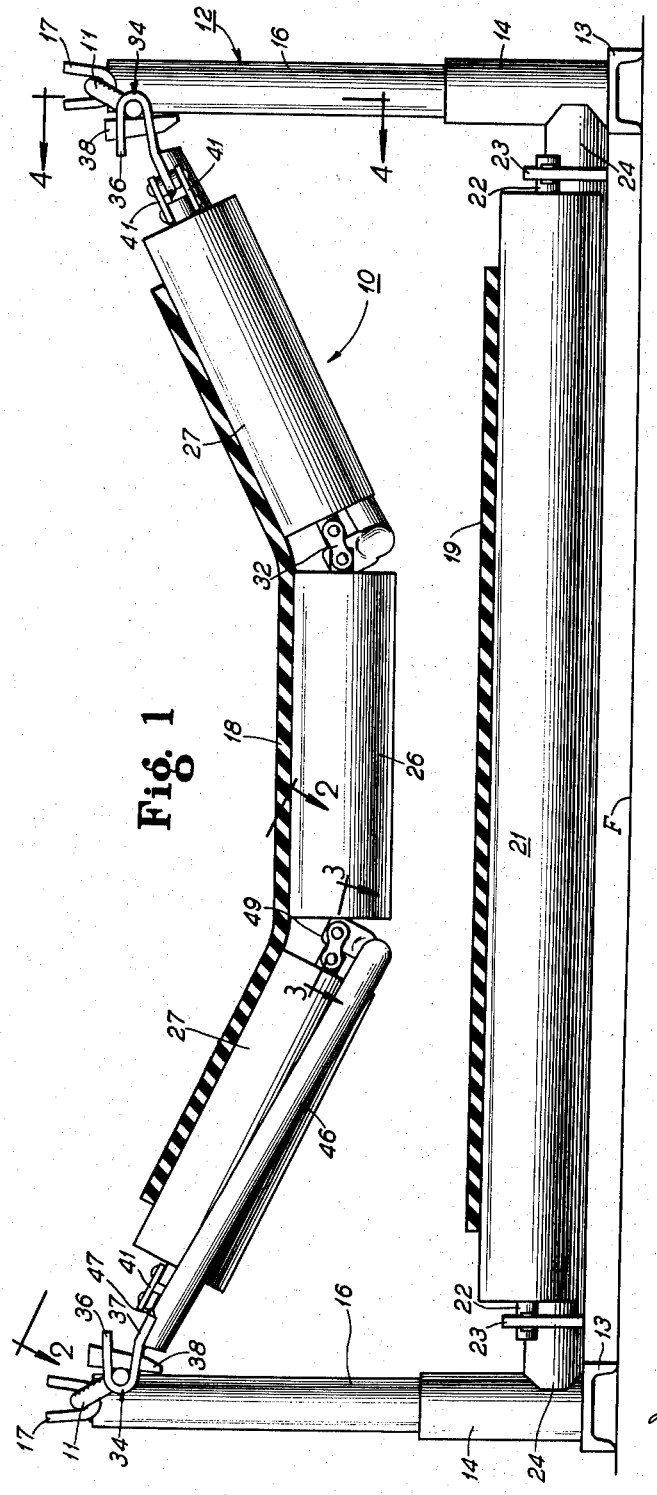
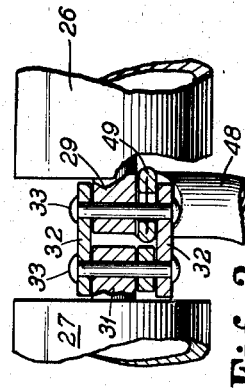
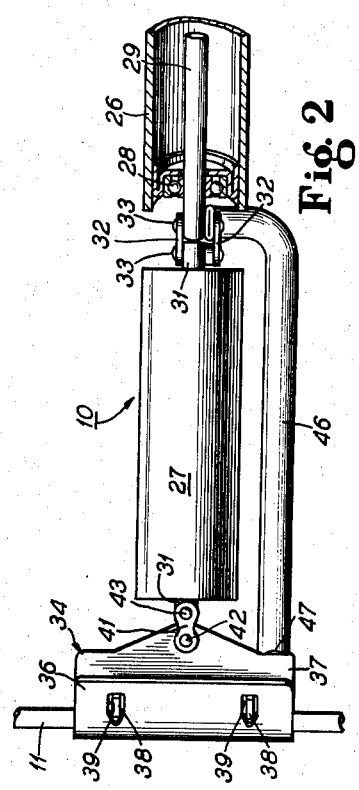
INVENTOR.
Keith McCann
BY
Murray A. Gleeson
ATTORNEY United States Patent Office 2,868,355
Patented Jan. 13, 1959

2,868,355

TROUGHING ROLLER ASSEMBLY FOR BELT CONVEYOR

Keith McCann, Taylorville, Ill., assignor to Goodman Manufacturing Company, Chicago, Ill., a corporation of Illinois Application December 23, 1957, Serial No. 704,774

4 Claims. (Cl. 198—192)

This invention relates to an improved troughing roller assembly for belt conveyors of the type where the conveying reach is supported upon laterally spaced flexible strands and particularly to an assembly capable of minimizing any detraining effect during downhill operation of the conveyor.

In belt conveyors of the type where the load on the conveying reach is transferred into laterally spaced support strands or ropes by means of troughing roller assemblies having roller members connected for freely articulating movement in the plane of the assembly, downhill operation of the conveyor causes the assembly to swing out of a plane perpendicular to the support strands. Such downhill operation causes the outer or wing rollers to have their outer ends canted in an "upstream" direction, and upon any tendency of belt misalignment, such canted position of the wing rollers tends to increase the detraining effect rather than correcting same.

According to the present invention the troughing roller is arranged for movement as a unit in a plane which is at all times perpendicular to the longitudinal axis of the support strands. During downhill operation of the conveyor the troughing roller assembly is constrained so as to remain in the aforementioned plane, rather than moving in pendulum fashion to a vertical plane.

One of the principal objects of this invention is to provide an improved troughing roller assembly capable at all times of being maintained in a plane which is perpendicular to the longitudinal axis of the support strands.

Another object is to provide a troughing roller assembly capable of freely articulating in a plane which is always perpendicular to the longitudinal axis of the support strands.

Other objects and important features of the invention will be apparent from a study of the specification following taken with the drawings which together describe and illustrate a preferred embodiment of the invention and what is now considered to be the best mode of practicing the principles thereof. Other embodiments may be suggested to those having the benefit of the teachings herein, and such other embodiments are intended to be reserved especially as they fall within the scope and spirit of the subjoined claims.

In the drawings:

Fig. 1 is an elevational view of an improved troughing roller assembly according to the present invention;

Fig. 2 is a plan view of a portion of the troughing roller assembly seen in Fig. 1;

Fig. 3 is a detailed cross-section view, to an enlarged scale, taken along the line 3—3 of Fig. 1 and looking in the direction of the arrows.

Figure 4:
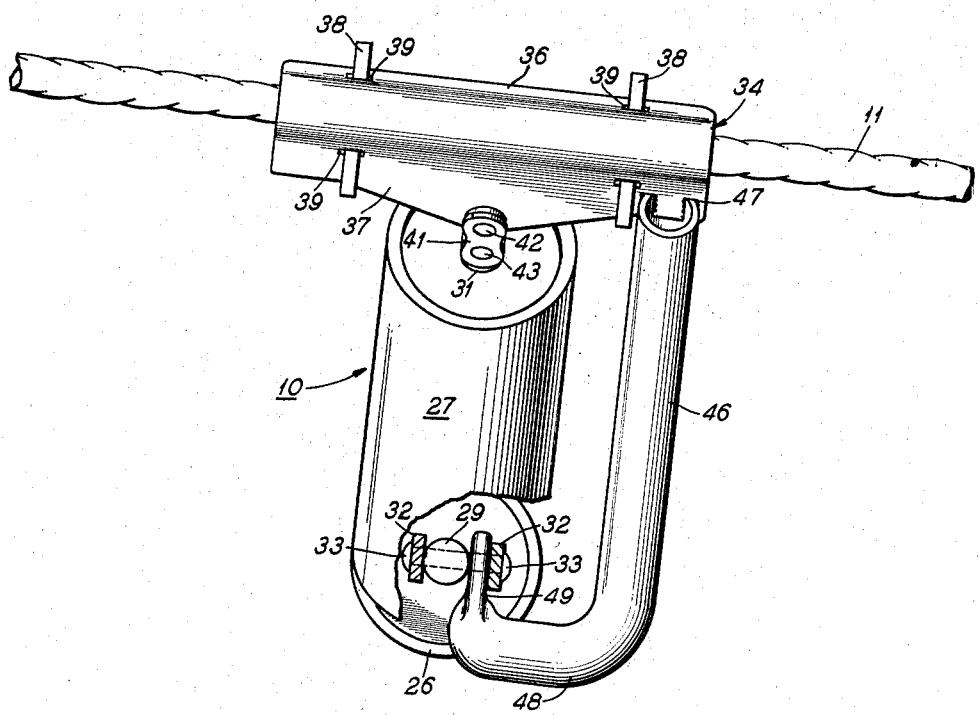
Fig. 4 is an end elevational view, to an enlarged scale, of the troughing roller assembly seen in Fig. 1.

Referring now to the drawings, the improved troughing roller assembly according to the present invention is indicated generally by the reference numeral 10, and is adapted to be suspended between a pair of laterally spaced flexible support strands or wire ropes 11, which in turn are supported at intervals throughout their length upon standards indicated generally by the reference numeral 12.

Each such standard includes a pair of laterally spaced feet 13 resting upon a mine floor F, each of the feet 13 having a tubular socket 14 extending upward therefrom into which an adjustable post or column 16 is fitted. The upper end of the adjustable posts 16 is provided with a U-shaped saddle 17 for the rope strand 11. The posts 16 may be positioned in their sockets 14 by any suitable adjusting means, not shown, so that the saddles 17 are in a common horizontal plane.

The troughing roller assembly 10 is arranged to support the load upon a conveying reach 18 of an endless conveyor belt having a return reach 19 supported upon a return idler roller 21 turning upon a shaft 22. Brackets 23 extend from one side of a strut member 24 and support the idler shaft 22 at the ends thereof. Strut member 24 extends between the tubular sockets 14 and the telescoping posts 16 to maintain them in properly spaced relationship.

The troughing roller assembly includes a center load supporting idler roller 26 which is flanked by inclined troughing or wing rollers 27. The center roller 26 is mounted on a bearing 28 at each end thereof supported upon an idler shaft 29, see Fig. 2. Wing rollers 27, likewise are supported upon an idler shaft 31 by bearings, not shown.

The center roller 26 is articulately connected to the wing roller 27 by means of links 32 having a pin connection 33 at each end thereof to the respective shafts 29 and 31. The rollers 26 and 27 are thus able to freely articulate in a common plane.

The troughing roller assembly 10 is suspended between the spaced strands 11 by means of a bracket 34 having an upper limb 36 and a lower limb 37 which embrace the strand 11. As seen in Figs. 2 and 4, the bracket 34 extends along the flexible rope strand 11 with the upper limb 36 and the lower limb 37 embracing the same, the bracket 34 being held in position to the strand 11 by means of locking pins 38 extending through aligned apertures 39 in the upper and lower limbs 36 and 37.

Each wing roller 27 is pivotally connected to the lower limb 37 of the bracket 34 by means of spaced links 41 having a pin connection 42 to the lower limb 37 and a pin connection 43 to the idler shaft 31 supporting the wing roller 27.

The troughing roller 10 thus far described is also provided with means which restrains it for movement in a plane perpendicular to the longitudinal axis of the rope strands 11. As seen in Fig. 4, the rope strands 11 are shown as they would be for a conveyor running downhill, for example. The bracket 34 has a frame member 46 welded as at 47 to the lower limb 37 thereof and extending inward from the bracket 34 alongside the wing roller 27. The frame member 46 has an extension 48 extending generally parallel to the rope strand and having a flattened portion 49 at right angles thereto which is connected to the pin 33 linking the shaft 29 of the center roller 26 to the links 32.

The length of the bracket 34 which extends along the rope strand 11 and the frame member 46 connected to the center idler shaft 29 effectively constrains the troughing roller assembly 10 for movement only in a plane which is perpendicular to the longitudinal axis of the rope strands 11. This is particularly important in downhill operation of a belt conveyor since the links 41 connecting the wing roller 27 to the bracket 34, while they are designed to impose a twist on the strands 11 in accordance with the loading on the conveying reach 18, yet enable the troughing roller assembly to hang in a vertical pendant position. Were it not for the frame 46 maintaining the troughing roller assembly in the aforesaid planar position, the outer end of the wing rollers would be canted in an "upstream" direction, which would tend to detrain the conveying reach 18.

While the invention has been described in terms of a preferred embodiment thereof its scope is intended to be limited only by the claims here appended.

I claim as my invention:

1. A troughing roller assembly of the type where the load carrying reach is supported upon laterally spaced strands by troughing roller assemblies suspended across said strands at intervals therealong, the improvement in such troughing roller assembly for maintaining the same in a plane perpendicular to the longitudinal axis of said strands especially during downhill operation of said conveyor which comprises, a plurality of idler rollers articulately connected for movement in the aforesaid plane, a bracket for connecting each end of said assembly to an adjacent strand, said bracket comprising spaced limbs extending along said strand and anchored to said strand at spaced points thereon, a frame member rigidly secured to said bracket, and extending alongside the outermost roller of said assembly, an extension from said frame member extending between said outermost roller and its adjacent inner roller, and means for providing free articulation between said adjacent rollers supported at the end of said extension.

2. A troughing roller assembly of the type where the load carrying reach is supported upon laterally spaced strands by troughing roller assemblies suspended across said strands at intervals therealong, the improvement in such troughing roller assembly for maintaining the same in a plane perpendicular to the longitudinal axis of said strands especially during downhill operation of said conveyor which comprises, a plurality of idler rollers articulately connected for movement in the aforesaid plane, a bracket for connecting each end of said assembly to an adjacent strand, said bracket comprising spaced limbs extending along said strand and anchored to said strand at spaced points thereon, a frame member extending from said bracket alongside the outermost roller of said assembly, an extension from said frame member extending between said outermost roller and its adjacent inner roller, and means for providing free articulation between said adjacent rollers supported at the end of said extension.

3. A troughing roller assembly of the type where the load carrying reach is supported upon laterally spaced strands by troughing roller assemblies suspended across said strands at intervals therealong, the improvement in such troughing roller assembly for maintaining the same in a plane perpendicular to the longitudinal axis of said strands especially during downhill operation of said conveyor which comprises, a plurality of idler rollers articulately connected for movement in the aforesaid plane, bracket means for connecting each end of said assembly to an adjacent strand, said bracket means including means for anchoring same to said strand at spaced points thereon, a frame member rigidly secured to said bracket means, and extending alongside the outermost roller of said assembly, an extension from said frame member extending between said outermost roller and its adjacent inner roller, and means for providing free articulation between said adjacent rollers supported at the end of said extension.

4. A troughing roller assembly of the type where the load carrying reach is supported upon laterally spaced strands by troughing roller assemblies suspended across said strands at intervals therealong, the improvement in such troughing roller assembly for maintaining the same in a plane perpendicular to the longitudinal axis of said strands especially during downhill operation of said conveyor which comprises, a plurality of idler rollers articulately connected for movement in the aforesaid plane, bracket means for connecting each end of said assembly to an adjacent strand, said bracket means including means for anchoring same to said strand at spaced points thereon, a frame member extending from said bracket means alongside the outermost roller of said assembly, an extension from said frame member extending between said outermost roller and its adjacent inner roller, and means for providing free articulation between said adjacent rollers supported at the end of said extension.

No references cited.